(12) United States Patent
Bourdeau

(10) Patent No.: US 6,614,979 B2
(45) Date of Patent: Sep. 2, 2003

(54) CHASSIS FOR FIBER OPTIC COMMUNICATION EQUIPMENT

(75) Inventor: Michel Bourdeau, Hull (CA)

(73) Assignee: JDS Uniphase Inc., Ottawa (CA)

( * ) Notice: Subject to any disclaimer, the term of this patent is extended or adjusted under 35 U.S.C. 154(b) by 30 days.

(21) Appl. No.: 09/987,265

(22) Filed: Nov. 14, 2001

(65) Prior Publication Data

US 2002/0191940 A1 Dec. 19, 2002

Related U.S. Application Data

(60) Provisional application No. 60/298,401, filed on Jun. 18, 2001.

(51) Int. Cl.[7] ............................. G02B 6/00; G06F 1/16; H05K 7/00
(52) U.S. Cl. ....................... 385/135; 385/134; 361/686; 361/728; 361/729; 361/731
(58) Field of Search ........................... 385/14, 134–137, 385/147; 439/217, 218, 956; 361/683–686, 728, 729, 731, 741; 312/223.2; 211/41.17

(56) References Cited

U.S. PATENT DOCUMENTS 6,144,549 A * 11/2000 Moss et al. ................. 361/681
6,157,534 A * 12/2000 Gallagher et al. .......... 361/683
6,185,110 B1 * 2/2001 Liu ............................. 361/829
6,272,016 B1 * 8/2001 Matonis et al. ............. 361/716

* cited by examiner

Primary Examiner—Brian Healy
Assistant Examiner—Kevin S Wood
(74) Attorney, Agent, or Firm—Neil Teitelbaum

(57) ABSTRACT

A chassis for fiber optics communication equipment, having a housing with first and second opposing sides, and a back panel cooperating with the housing to provide fore-and-aft slots for cassettes containing optical communication equipment. A remote user interface module for making connections to other items of equipment, and a local user interface module for display of conditions in the cassettes, are situated at opposite sides of the housing, and are both connected to the base by docking stations which allow these modules to be interchanged in position so that either of the first or second sides of the housing may become the front of the chassis; i.e. may be adjacent the local user interface module. This allows the chassis to be reversible so that the cassettes can be removed either from the front or from the rear of the chassis while the local user interface module remains at the front of the chassis.

12 Claims, 9 Drawing Sheets

CHASSIS FOR FIBER OPTIC COMMUNICATION EQUIPMENT

This application claims benefit of Provisional No. 60/298,401 filed Jun. 18, 2001.

BACKGROUND OF THE INVENTION

1. Field of the Invention

The present invention relates to fiber optics communication equipment, and especially to a chassis for holding various components of such equipment including interchangeable cassettes, which may contain lasers, switches, meters, or other fiber optics components.

2. Prior Art

It is typical to provide fiber optics communication equipment, such as switching or testing equipment, in a rectangular chassis having a series of slots for accommodating a series of cassettes. Chassis of this kind usually have a power module for supplying power to the cassettes, a local user interface, which may include a keypad and display screen, and a remote user interface including a power entry and other remote connectors. A series of such chassis may be held in a stack. Typically, these local user and remote user interfaces have been at opposite ends of the chassis, with the various remote user interfaces superposed to enable easy interconnection.

Some users prefer that the cassettes be accessible for removal and replacement from the front of a chassis, which is beside the local user interface, while other users prefer that the cassettes are accessible from the back, beside the remote user interface. With the current design, if some chassis in a stack were reversed so that some have front and some have rear access to the cassettes, this would make an awkward arrangement since the remote user interfaces would be at different sides of the stack, thereby making interconnection thereof quite difficult.

An object of the present invention is to overcome the shortcomings of the prior art by providing a versatile modular equipment chassis that can be arranged in various ways, while maintaining a certain symmetry that facilitates interconnection of superposed chasses.

SUMMARY OF THE INVENTION

Accordingly, the present invention provides a chassis, which is reversible, in that it can easily be converted from a first configuration, in which the cassettes are removable from the front, to one in which they are removable from the back. In this context the "back" means the side of the chassis having the remote user interface module and the "front" means the side of the chassis having the local user interface module.

In accordance with one aspect of the invention, a modular equipment chassis comprises:

- a housing including a first open side, a second side, and at least one slot with an open end in the first open side for receiving at least one component contained in a removable cassette;
- a local user interface module for displaying the current status of at least one of the components and providing a local user manual interface for controlling at least one of the components;
- a remote interface module for enabling optical and/or electrical interconnection between each component and remote devices;
- a first docking station mounted in the first open side for receiving either one of the local user interface module or the remote interface module;
- a second docking station mounted in the second side for receiving either one of the local user interface module or the remote interface module; and
- back panel means for receiving each cassette and for electrically connecting the first docking station, the second docking station and each component;
- whereby the local user interface module and the remote interface module are interchangeable in position, so that either one of the local user interface module or the remote interface module can be positioned adjacent the open end of the at least one slot.

It will be understood that the term "side" as used above includes, for a rectangular chassis, both the front and back, and the lateral sides which connect the front and back. In the preferred arrangement, the first and second sides of the housing are on opposite sides, e.g. at the front and the back, of the chassis. Preferably also, the first docking station is in a diagonally opposed position to the second docking station. The chassis preferably further comprises a power module mounted in the second side thereof.

The chassis may also comprise securing means for connecting the local user interface module and the remote interface module to the housing, wherein the securing means comprises:

- a first abutting surface on the housing and a second abutting surface on each of the local user interface module and the remote interface module; and
- fastening means for holding the first and second abutting surfaces together.

Preferably, the first abutting surface of the housing is a side of the housing, and the remote user interface module and the local user interface module each have a second abutting surface in the form of a lower front flange with at least one screw hole for attachment to the respective side of the housing.

A plurality of the superposed modular equipment chassis may be superposed with their remote user interface modules superposed to facilitate interconnection thereof.

More specifically, the present invention provides a chassis for fiber optic communication equipment, comprising:

- a rectangular housing having first and second opposing sides;
- a back panel mounted parallel to said first and second sides, said back panel cooperating with the housing to provide fore-and-aft extending slots for receiving cassettes containing optical communication equipment;
- a remote user interface module for making connections to other remote equipment; and
- a display module providing a local user interface module for displaying the condition of the equipment in the cassettes;
- wherein said remote and local user interface modules are situated at opposite sides of the housing in docking stations, which docking stations enable the interface modules to be interchanged in position so that either of said first or second sides of the housing may become the front of the chassis, depending upon which of said first or second sides contains the local user interface module, whereby the chassis is reversible to allow the cassettes to be removed either from the front or from the rear of the chassis while the local user interface module remains at the front of the chassis.

To allow for reversing of the chassis as described, each of the lateral end members preferably has an ear at both of its ends, so that such ears project from the front of the chassis irrespective of whether it is the first or the second side which is at the front of the chassis.

BRIEF DESCRIPTION OF THE DRAWINGS

A preferred embodiment of the invention will now be described by way of example with reference to the accompanying drawings, in which.

DETAILED DESCRIPTION

Figure 1:
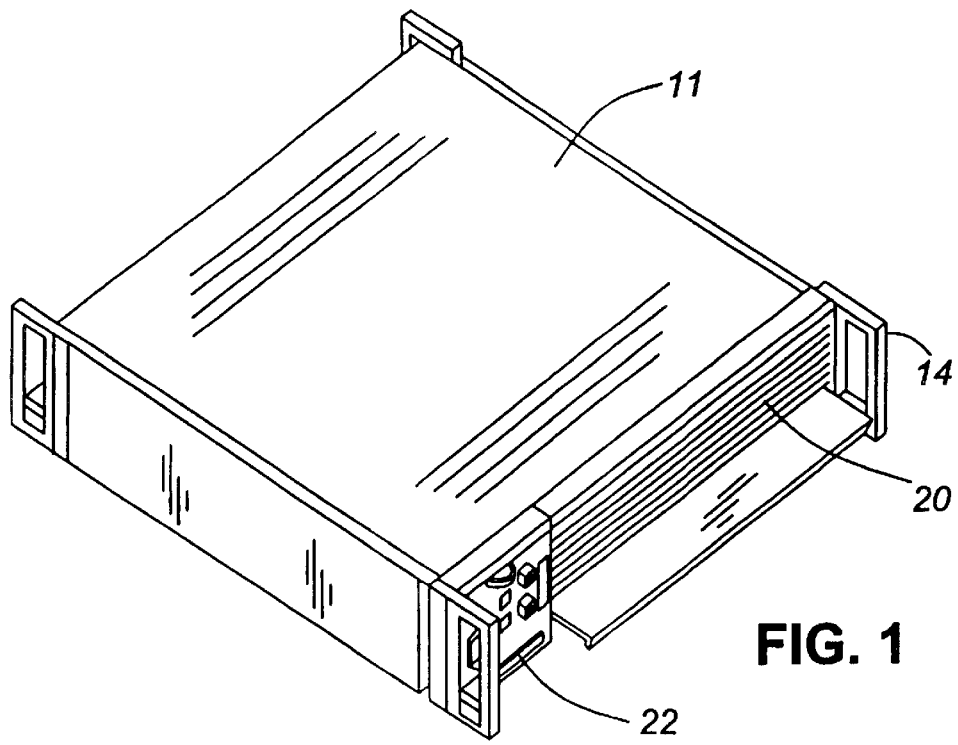
FIG. 1 is a view of the rear of the chassis in one configuration.
Figure 2:
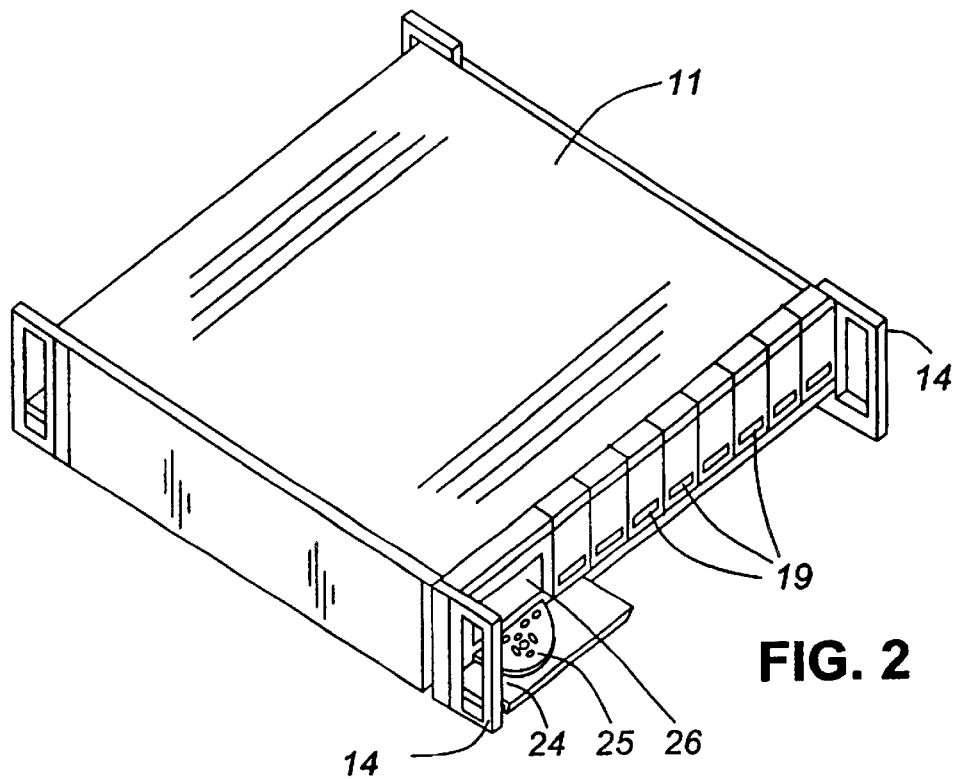
FIG. 2 is a view of the front of the chassis in the same configuration as FIG. 1.
Figure 3:
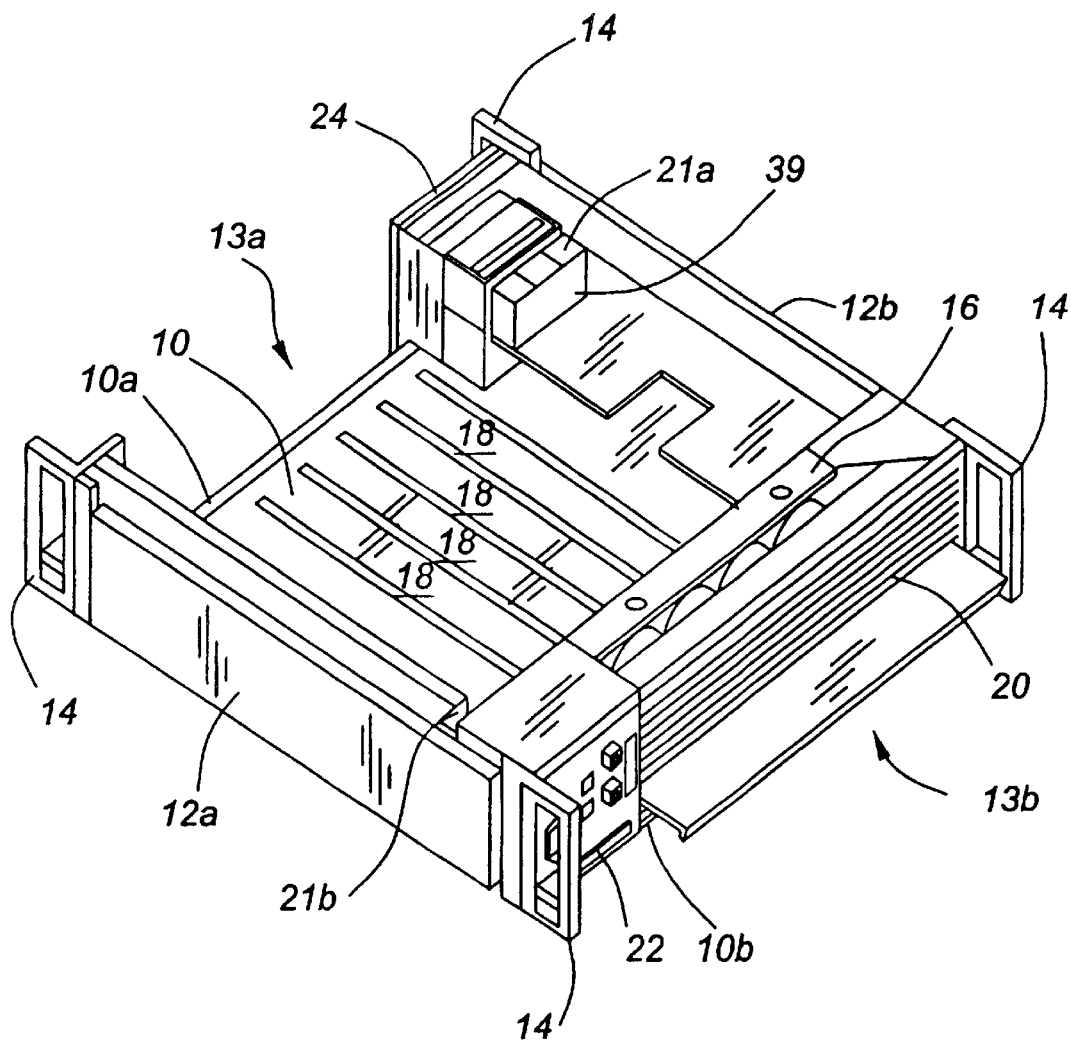
FIG. 3 is a view similar to FIG. 2 of the rear of the chassis in the same configuration but with the lid and cassettes removed.

FIGS. 1 to 3 of the drawings show a first configuration of the chassis. As seen in the partly disassembled condition in FIG. 3, the chassis includes a housing defined by a rectangular base 10, a cover 11, and two lateral sides 12a and 12b. The base 10 includes a first edge 10a and a second opposite edge 10b. The housing defines first and second accessible open sides 13a and 13b, i.e. the front and the back. Each end of each of the lateral end sides 12a and 12b has a handle in the form of an apertured ear 14 so that, irrespective of whether open side 13a or 13b is at the front of the chassis, the chassis has two of the ears 14 projecting from its front corners.

Figure 9:
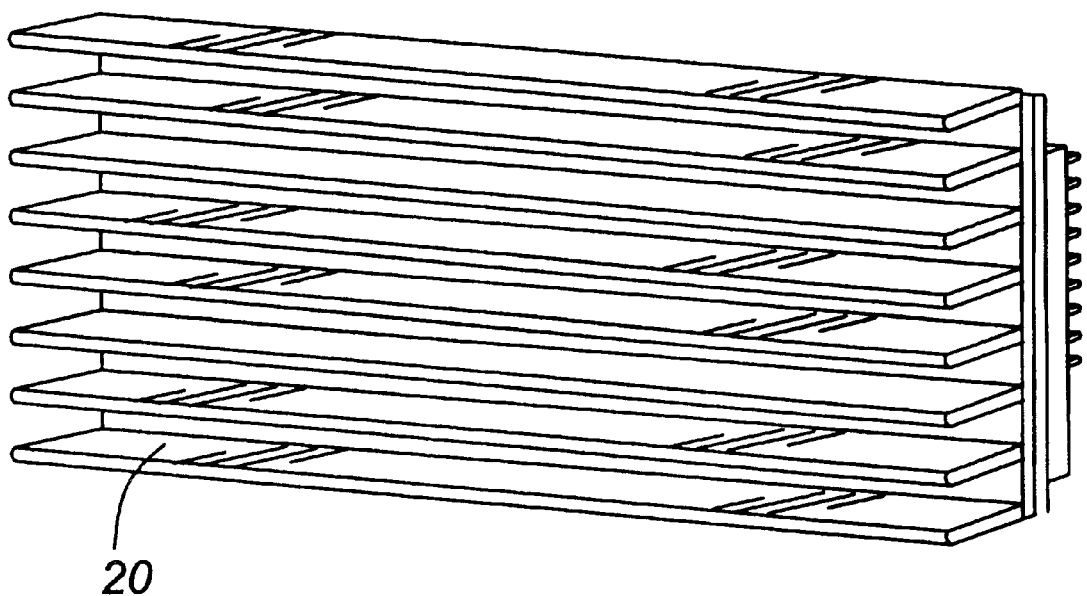
FIG. 9 is a perspective view of the front of the power module separated from the chassis.
Figure 10:
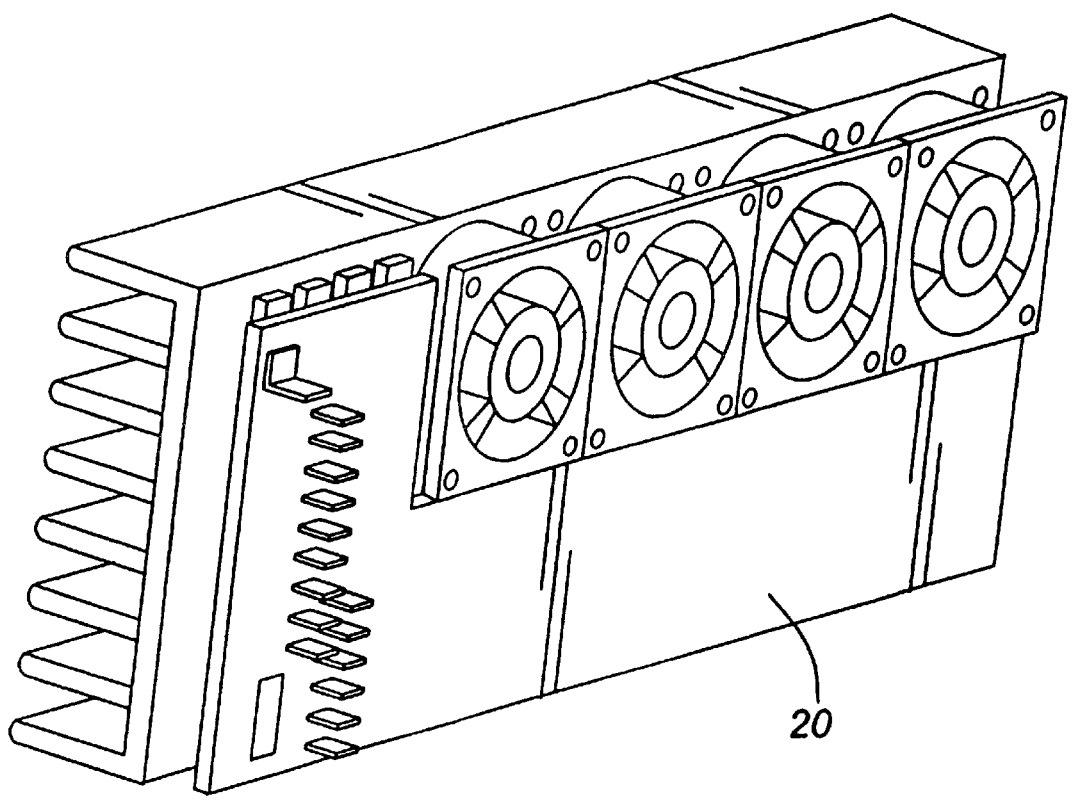
FIG. 10 is a perspective view of the rear of the same power module.

Spaced inwardly from, and parallel to, the second open side 13b of the housing is a back panel 16, which, along with the base 10, defines a series of fore-and-aft slots 18 for cassettes 19. The front ends of the cassettes 19 are shown in FIG. 2; these cassettes have been removed in FIG. 3 through the first open side 13a of the housing. The cassettes are of a conventional type used in optical communication equipment, and may include lasers, switches, attenuators, meters, etc. Power to the cassettes 19 is supplied by a power module 20, which is mounted in the second open side 13b adjacent to the back panel 16. The power module 20 can be conventional and permanently fixed to the chassis or it can have a modular configuration to facilitate replacement and/or modification. Perspective views of the power module are shown in FIGS. 9 and 10.

The opposite corners of the housing include docking stations 21a and 21b for receiving the two interface modules, namely the remote user interface module 22 and the local user interface or display module 24; these are also shown in detail, respectively, in FIGS. 5 and 6, and FIGS. 7 and 8, of the drawings. The remote user interface module 22 includes the power entry as well as other remote connectors, and may include such standard connectors as RS232, GP1B, etc., which are well known in the art. The local user interface or display module 24 as shown includes a keypad 25 and a display screen 26 for displaying the current status of and allowing control of the equipment in the chassis. Apart from special configuration and connecting means to be described, both the modules 22 and 24 are of types known per se in the art.

As indicated above, it is preferred that the local user interface module 24 always be at the front of the chassis, and it is preferable that the remote user interface module 22 always be at the back, and that when a series of chassis are formed into a stack the corresponding modules are above each other. Nevertheless customers have differing requirements as to whether the cassettes 19 should be removable from the front or the back of the chassis. For this reason, the chassis of this invention is made reversible by arranging that the remote user interface module 22 and the local user interface module 24 are at opposite sides, and preferably at opposite corners, of the chassis, and are interchangeable in position. For this purpose the chassis has similar docking stations at each corner, including a first docking station 21a mounted in the first open side 13a of the housing, and a second docking station 21b mounted in the second open side 13b, each of which can receive either of the two modules 22 and 24. Specific advantage is gained by positioning the docking stations 21a and 21b at opposite corners of the housing so that the interface modules 22 and 24 of different chassis can be superposed regardless of which way the chassis is facing. In particular, when a stack of chassis is assembled, it is usually important that the remote user interface modules are superposed to enable the interconnecting cables to be attached easily, without having to run cable across the back or over the top of the chassis.

Figure 4:
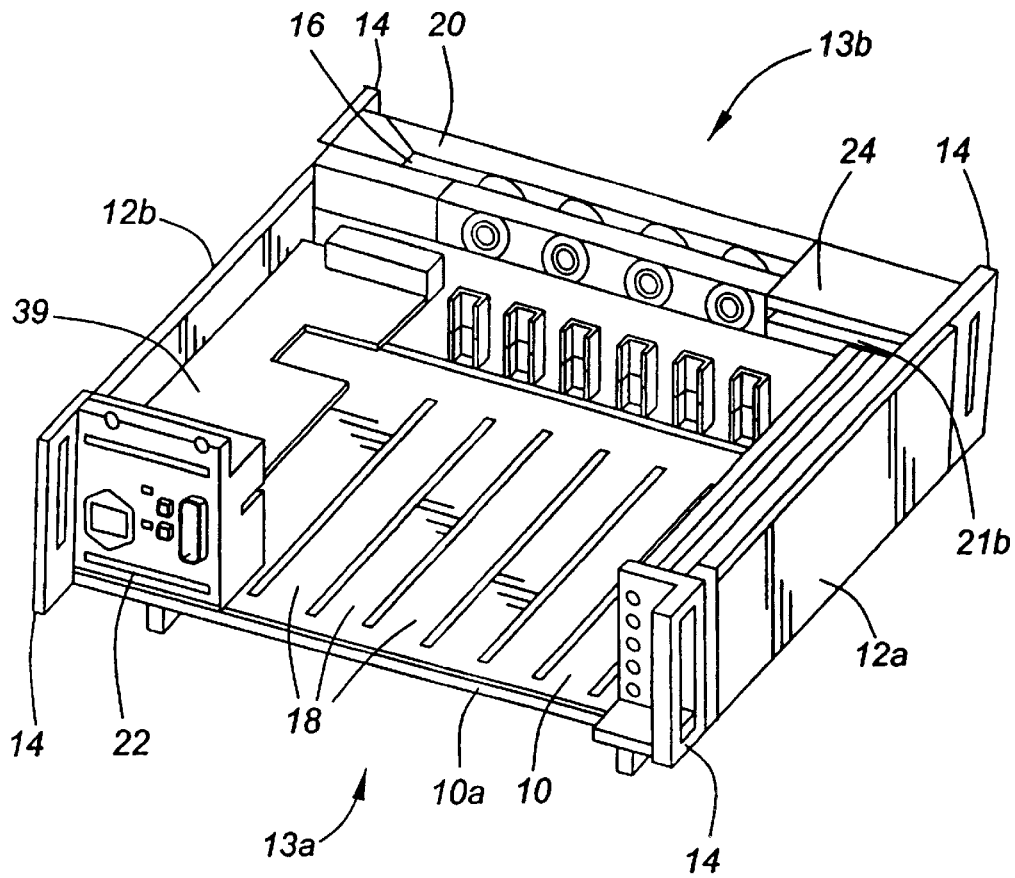
FIG. 4 is a view of the chassis showing the same parts as FIG. 3 but with the remote interface and local user interface modules having been interchanged in accordance with the invention.

Thus, in FIGS. 1 to 3 the local user (or display/keypad) interface module 24 is aligned with the first edge 10a of the base 10 in the open side 13a. The local user interface 24 is also aligned with the fronts of the cassettes 19, as in FIG. 1, or with the fronts of the slots 18 which receive the cassettes, as in FIG. 3. The remote user interface module 22 is mounted in the opposite corner, i.e. at the back of the chassis, and aligned with the second edge 10b. In FIG. 4, the configuration has been reversed so that the remote user interface module 22 is aligned with the first edge 10a of the base 10 and with the fronts of the cassette slots 18, while the local user interface module 24 is aligned with the power module 20. In this latter case, the chassis will be reversed so that the first edge 10a and the remote user interface module 22 are at the rear, and so that the cassettes 19 are inserted into, and removed from, the rear of the chassis.

Figure 5:
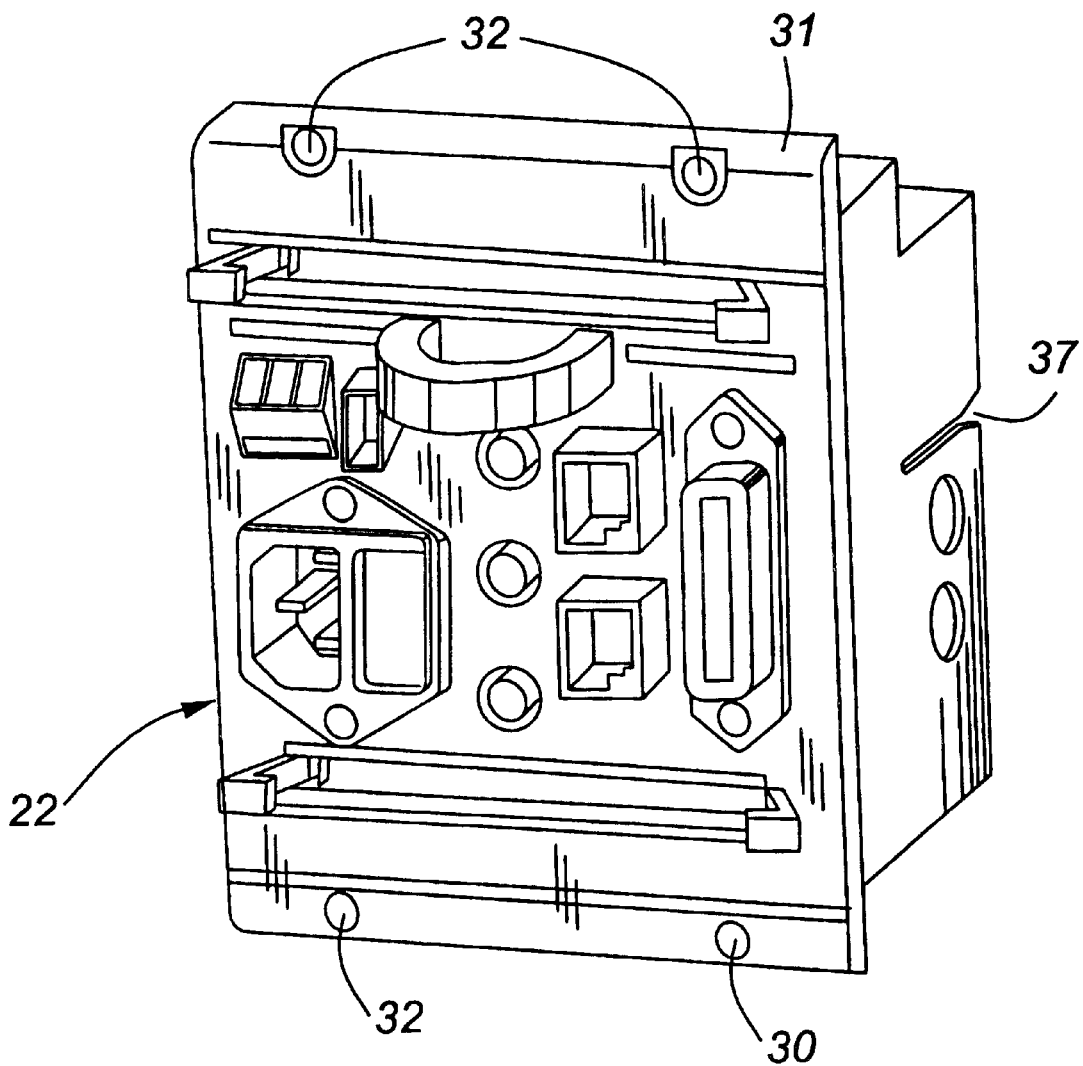
FIG. 5 is a perspective view of the front of the remote user interface module separated from the chassis.
Figure 6:
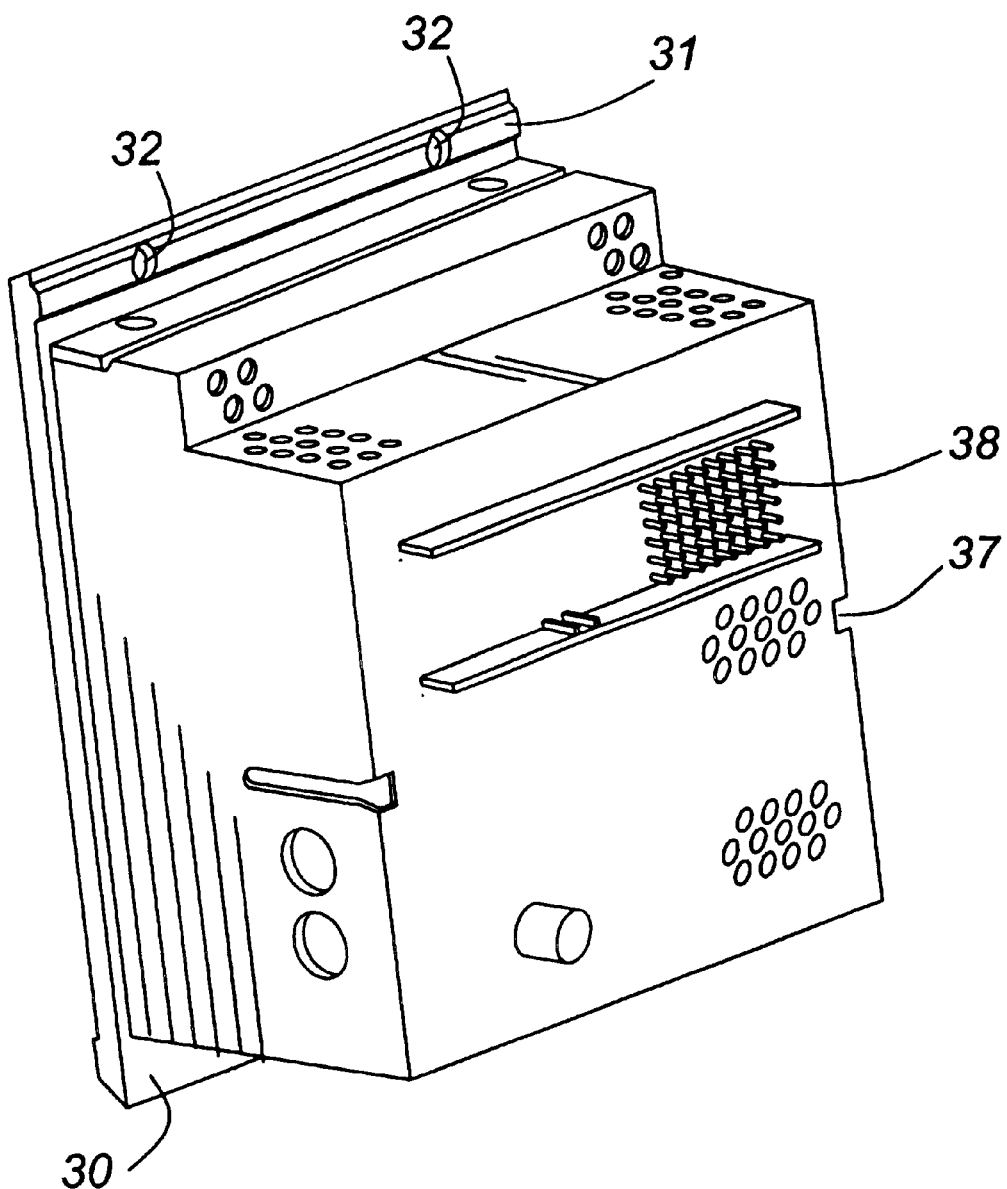
FIG. 6 is a perspective view of the rear of the same interface module.
Figure 7:
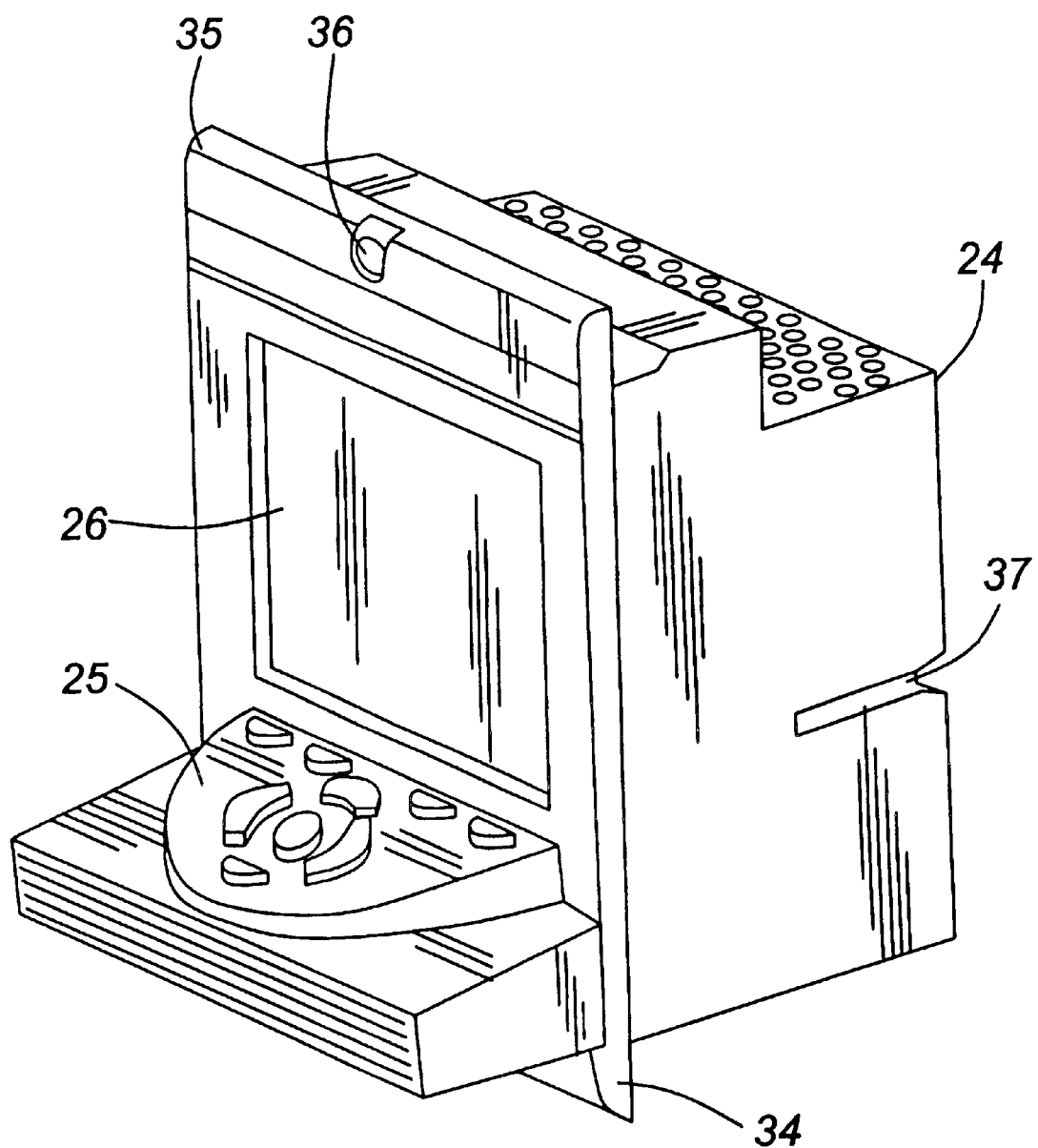
FIG. 7 is a perspective view of the front of the local user interface module separated from the chassis.
Figure 8:
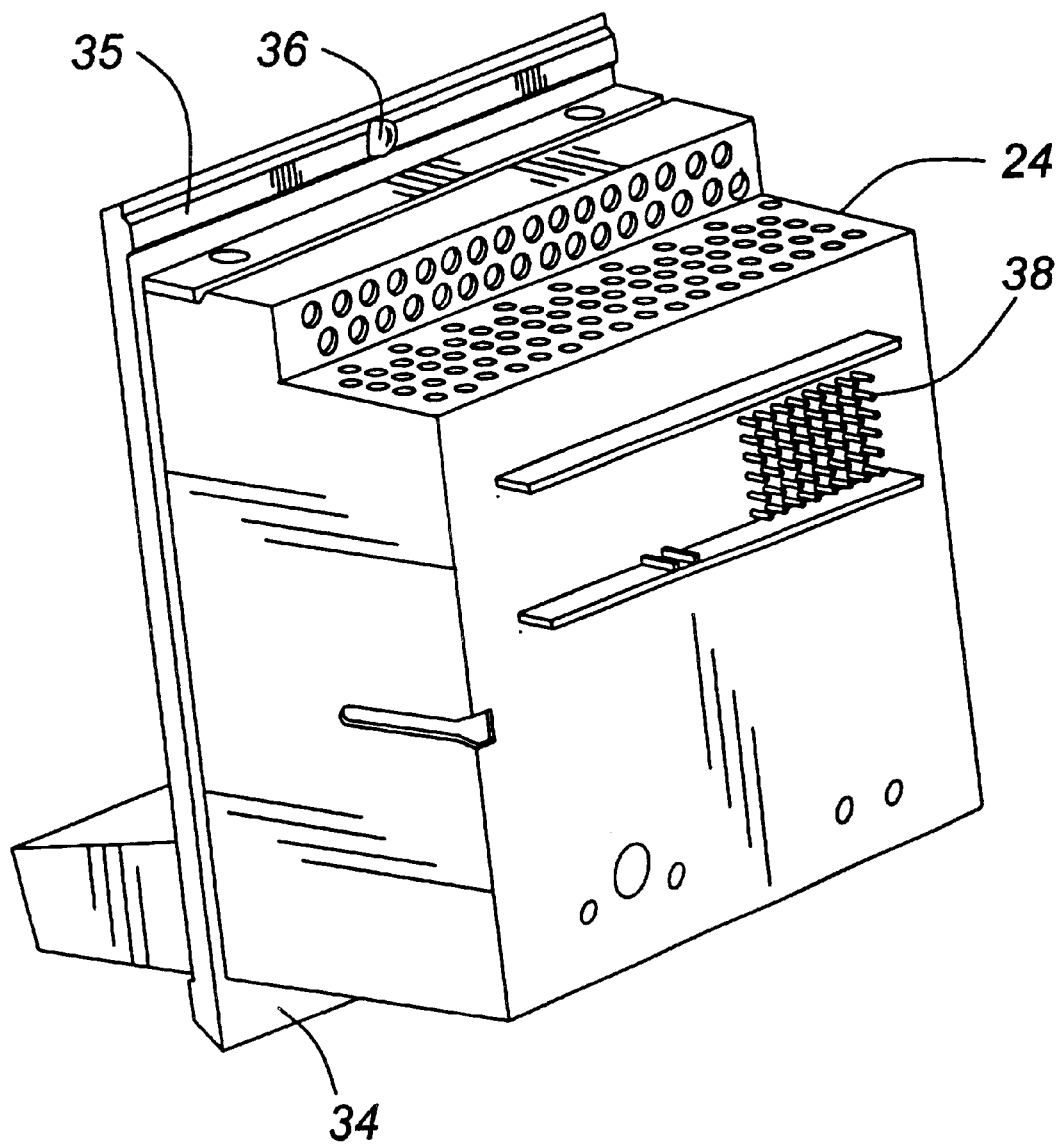
FIG. 8 is a perspective view of the rear of the same local user interface module.

To provide this interchange ability, both the remote user interface module 22 of FIGS. 5 and 6, and the local user interface module 24 of FIGS. 7 and 8, are made with similar mounting flanges. Thus, as seen in FIGS. 5 and 6, the remote user interface module 22 has lower and upper mounting flanges 30 and 31, respectively, each flange having two screw holes 32. The lower flange 30 can be attached to one or other of housing edges 10a or 10b in either of the positions shown in FIGS. 3 and 4, respectively, by screws inserted into holes 32 and into screw holes in the appropriate edge of the housing. Similarly, the local user interface module 24 has lower and upper flanges 34 and 35, respectively, each with screw holes 36. Accordingly, the lower flange 34 can be attached to the base 10 in either of the positions shown in FIGS. 3 and 4 by screws inserted into the holes 36 and into the appropriate edge of the base 10.

Both of the interface modules 22 and 24 are electrically connectable internally of the chassis housing to the docking stations 21a and 21b using pin connectors 38. Each docking station has a plurality of holes, i.e. approximately 264, for receiving the pin connectors 38 extending from the interface modules 22 and 24. The array of holes in the first docking station 21a directly corresponds to the array of holes in the second docking station 21b, whereby each pair of corresponding holes provides access to the same circuit. In practice, the local interface module 22 has fewer pins than the remote user interface 24, because the remote user interface 24 does not require access to as many circuits as the remote interface module 24.

As shown in FIGS. 5 to 7, each of the user interface modules 22 and 24 has a slot 37 in their rearward or inwardly facing side. These slots 37 receive front or rear edges of a printed circuit board 39 seen in FIGS. 3 and 4.

When the user interface modules have been suitably positioned on the base 10, the cover 11 is fitted over the parts as shown in FIGS. 1 and 2. This lid has screw holes in its edges similar to those of base 10, and these holes receive screws inserted into holes 32 and 36 in the upper flanges 31 and 35 of the two user interface modules 22 and 24.

It will be seen that the components described can provide two types of chassis, one with the cassettes 19 accessible from the front, and one with the cassettes 19 accessible from the back, the chassis having in each case a local user interface module 24, such as a display module, which is at the front of the chassis. In fact, since some components of the chassis such as the back panel 16 and power module 20, are conventional, the basic parts of the invention may be limited to the housing, the two user interface modules 22 and 24, and their docking stations 21a and 21b.

What is claimed is:

1. A modular equipment chassis comprising:
    a housing including a first open side, a second open side, and at least one slot with an open end in the first open side for receiving at least one component contained in a removable cassette;
    a local user interface module for displaying the current status of at least one of the components, and providing a manual interface for controlling at least one of the components;
    a remote interface module for enabling optical and/or electrical interconnection between at least one of the components and remote devices;
    a first docking station mounted in the first open side for receiving either the local user interface module or the remote interface module;
    a second docking station mounted in the second open side for receiving the local user interface module or the remote interface module; and
    back panel means mounted in the housing for receiving each cassette and for electrically connecting the first docking station, the second docking station and each component;
    whereby the local user interface module and the remote interface module are interchangeable in position, so that either one of the local user interface module or the remote interface module can be positioned adjacent the open end of the at least one slot.

2. The modular equipment chassis according to claim 1, wherein the first open side and the second side are on opposite sides of the chassis.

3. The modular equipment chassis according to claim 2, wherein the first docking station is in a diagonally opposed position to the second docking station relative to said housing; whereby, when a plurality of chassis are superposed, the docking stations will always be superposed to facilitate interconnection.

4. The modular equipment chassis according to claim 3, further comprising a power module mounted in the second side thereof.

5. The modular equipment chassis according to claim 1, further comprising securing means for connecting the local user interface module and the remote interface module to the housing, wherein the securing means comprises:
    a first abutting surface on the housing;
    a second abutting surface on each of the local user interface module and the remote interface module; and
    fastening means for holding the first and second abutting surfaces together.

6. A plurality of superposed modular equipment chassis according to claim 3, wherein the remote interface modules are superposed to facilitate interconnection.

7. A chassis for fiber optic communication equipment, comprising:
    a rectangular housing having first and second opposing sides;
    a back panel mounted parallel to said first and second sides, said back panel cooperating with the housing to provide fore-and-aft extending slots for receiving cassettes containing optical communication equipment;
    a remote user interface module for making connections to other remote equipment; and
    a display module providing a local user interface module for displaying the condition of the equipment in the cassettes;
    wherein said remote and local user interface modules are situated at opposite sides of the housing in docking stations, which docking stations enable the interface modules to be interchanged in position so that either of said first or second sides of the housing may become the front of the chassis, depending upon which of said first or second sides contains the local user interface module, whereby the chassis is reversible to allow the cassettes to be removed either from the front or from the rear of the chassis while the local user interface module remains at the front of the chassis.

8. The modular equipment chassis according to claim 7, wherein a first docking station is in a diagonally opposed position to a second docking station relative to said housing; whereby, when a plurality of chassis are superposed, the docking stations will always be superposed to facilitate interconnection, regardless of which side is the front.

9. The chassis according to claim 8, wherein said remote and local user interface modules each have a lower and an upper front flange, each upper and lower flange having at least one hole for attachment to the respective first or second side of the housing.

10. The chassis according to claim 8, wherein the local user interface module includes a keypad for entering commands for the equipment in the cassettes, and a display for displaying the status of the equipment in the cassettes.

11. The chassis according to claim 8, further comprising a power module adjacent to the back panel for supplying power to the equipment in the cassettes.

12. The chassis according to claim 8, further comprising a first handle extending from the first side, and a second handle extending from the second side, whereby a handle projects from each side of the chassis irrespective of whether the first of the second side is the front of the chassis.

* * * * *